United States Patent [19]

Schmid et al.

[11] Patent Number: 5,288,799
[45] Date of Patent: Feb. 22, 1994

[54] THERMOPLASTIC MOLDING COMPOSITIONS WHICH ARE MIXTURES OF AMORPHOUS AND SEMI-CRYSTALLINE POLYAMIDES, A METHOD OF PREPARATION THEREOF AND PRODUCTS MADE THEREFROM

[75] Inventors: Eduard Schmid; Helmuth Thullen, both of Bonaduz, Switzerland

[73] Assignee: EMS-Inventa AG, Switzerland

[21] Appl. No.: 908,322

[22] Filed: Jul. 2, 1992

[30] Foreign Application Priority Data

Jul. 4, 1991 [DE] Fed. Rep. of Germany ....... 4122211

[51] Int. Cl.⁵ .............................................. C08L 77/00
[52] U.S. Cl. ...................................... 525/6; 525/183; 525/420.5
[58] Field of Search ...................... 525/420.5, 66, 183; 528/339.3

[56] References Cited

U.S. PATENT DOCUMENTS

| | | | |
|---|---|---|---|
| 4,062,819 | 12/1977 | Mains et al. | 525/432 |
| 4,299,744 | 11/1981 | Stewart | 525/183 |
| 4,410,661 | 10/1983 | Epstein et al. | 525/66 |
| 4,977,213 | 12/1990 | Groud-Abel et al. | 525/66 |

*Primary Examiner*—Ana L. Carrillo
*Attorney, Agent, or Firm*—Jordan B. Bierman

[57] ABSTRACT

Thermoplastic molding compositions including a semi-crystalline polyamide a) and an amorphous copolyamide b), the latter containing dimerized fatty acid as one monomer building block. Optionally, a compatibility agent and other additives are also included.

The molding compounds having high stiffness up to at least 100° C. are produced by melt-mixing components a) and b), and optionally a compatibilizer, and are used for making molded parts which are outstanding in their thermal properties, high solvent resistance, and resistance to stress corrosion.

29 Claims, 5 Drawing Sheets

THERMOPLASTIC MOLDING COMPOSITIONS WHICH ARE MIXTURES OF AMORPHOUS AND SEMI-CRYSTALLINE POLYAMIDES, A METHOD OF PREPARATION THEREOF AND PRODUCTS MADE THEREFROM

The invention relates to thermoplastic molding compositions of an amorphous copolyamide which contain dimerized fatty acid as one building block, a semicrystalline polyamide and, optionally, a compatibility agent; the semicrystalline polyamide preferably forming the continuous phase and the amorphous copolyamide preferably forming the dispersed phase.

BACKGROUND OF THE INVENTION

In EP 70 001 B2, a thermoplastic molding resin of semicrystalline polyamide and amorphous copolyamide is disclosed. In U.S. Pat. No. 4,410,661, thermoplastic polyamide blends of semicrystalline polyamide and amorphous copolyamides from isophthalic acid, terephthalic acid, hexamethylene diamine, and bis-(p-aminocyclohexyl)methane, as well as impact resistance modifiers of the olefinic or core-shell polymer type are described. The disadvantage of both molding resins is that objects made from them are very sensitive to hot——and in particular boiling—water; preforms from a molding resin with a semicrystalline polyamide fraction of 40% by weight or less, completely lose their form stability, and those with a semicrystalline polyamide fraction of greater than 40% by weight suffer a substantial reduction in their stiffness.

In U.S. Pat. No. 3,200,428, there are described glass fiber-reinforced polyamide blends based on partially semi-crystalline polyamides with a fraction of amorphous transparent polyamides constituting a maximum of 20% by weight. These polyamide blends also do not meet the requirements in the temperature range above 100° C. and in a humid atmosphere.

In EP 325,030 A2, a polyamide mixture is taught having an especially low second-order transition temperature and improved gas barrier-properties; the mixture consists of a specific copolyamide and an aliphatic homopolyamide. Here, too, the mechanical properties under action of heat and moisture are insufficient.

In DE-OS 3 817 279 A1, thermoplastic molding compounds of an amorphous part-aromatic copolyamide, a semicrystalline polyamide, and up to 60% by weight of a rubber-elastic polymer are set forth. These molding compounds have the disadvantage of poor mechanical properties under the combined action of heat and water.

BRIEF DESCRIPTION OF THE PRESENT INVENTION

It was therefore the object of the present invention to develop thermoplastic polyamide compositions which can easily be shaped into parts of good stability to solvents and good stress corrosion resistance, as well as high rigidity at temperatures of at least 100° C.; also, in the conditioned state, their rigidity should not diminish substantially.

Accordingly, the invention is based on the surprising finding that specific amorphous copolyamides with dimerized fatty acids as one building block, in combination with semicrystalline polyamides, impart the desired properties to the molding compositions. The stability of the compositions on processing copolyamide can be improved by the addition of a compatibility agent. All parts and percentages set forth in the specification and claims are by weight unless otherwise stated.

The thermoplastic molding compositions according to the invention comprise
a) 25-75 parts of a semicrystalline polyamide;
b) 75-25 parts of an amorphous copolyamide of
  (i) 25-45 molar parts of at least one aromatic dicarboxylic acid,
  (ii) 25-5 molar parts of dimerized fatty acid with 36 to 45 carbon atoms, and
  (iii) 50 molar parts of at least one cycloaliphatic diamine, the sum of said acids and said amine being present in equimolar portions; and
c) 0-30 parts of a compatibility agent,
a), b), and c) totaling 100 parts.

Optionally, additives which are customary in the art may also be included.

In another aspect of the invention, the molding compositions comprise
a) 25-75 parts by weight of a semicrystalline polyamide;
b) 75-25 parts by weight of an amorphous copolyamide of
  (i) 25-45 molar parts of at least one aromatic dicarboxylic acid,
  (ii) 25-5 molar parts of dimerized fatty acid,
  (iii) 30-50 molar parts of at least one cycloaliphatic diamine,
  (iv) 0-20 molar parts of non-aromatic dicarboxylic acids,
  (v) 0-20 molar parts of additional diamine,
  (vi) 0-30 molar parts of lactams or ω-aminocarboxylic acids, the acids (i), (ii), and (iv), and the amine components (iii) and (v) being present in amounts such that the number of acid groups equals the number of amine groups, and the sum of portions of (iv), (v), and (vi) are 0-30 parts;
c) 0-30 parts of a compatibilty agent, the portions a), b) and c) totaling 100 parts.

Optionally, customary additives according to the prior art may also be included.

DETAILED DESCRIPTION OF THE INVENTION

A preferred composition contains amorphous copolyamides of 5 to 12 molar parts of dimerized fatty acid and 38-45 molar parts of at least one aromatic dicarboxylic acid. The compatibility agent c) is present in a preferable amount of between 1 and 30 parts; especially preferred is less than 10 parts. The customary additives according to the prior art include special processing aids and stabilizers. Preferred are impact modifiers, flame retardants, fillers, and/or reinforcing fibers.

As the semicrystalline component a), a homopolyamide of ω-amino-carboxylic acid or lactam having 6 to 9 carbon atoms is useful. It can also be made from aliphatic diamines with 4 to 12 carbon atoms and linear dicarboxylic acids of 6 to 12 carbon atoms; wherein the ratio of—$CH_2$—to CONH should remain below 9. Preferred are PA 6, PA 6.6, PA 4.6, PA 6.9, PA 6.10, and PA 6.12. Suitable also are semicrystalline copolyamides with a melting point (endothermic maximum in the DSC-curve), of at least 170° C. Copolyamides based on the monomers of PA 4.6, PA 6.6, PA 6.8, PA 6.9, PA 6.10, PA 6.12, PA 9.6, PA 12.6, and PA 6 are also particularly desirable. Especially preferred as the semicrystalline component are those polyamides copolyamides which have good resistance to solvents, good stress corrosion resistance, good processability in injection molding, and a melting point of at least 170° C.

Preferred component b) according to the invention comprises copolyamides of (i) at least one mononucleic and/or multinucleic aromatic dicarboxylic acid, (ii) dimerized fatty acids having 36 to 45 carbon atoms, the dimer portion of which is preferably at least 90%; in particular at least 97%; and (iii) at least one cycloaliphatic diamine having at least one ring containing 6 carbon atoms;

(iv) optional non-aromatic dicarboxylic acids;

(v) optional aliphatic diamines; and (vi) optional lactams and ω-aminocarboxylic acids.

Preferred aromatic acids are isophthalic acid, terephthalic acid, naphthalene dicarboxylic acid, 5-tert-butylisophthalic acid,

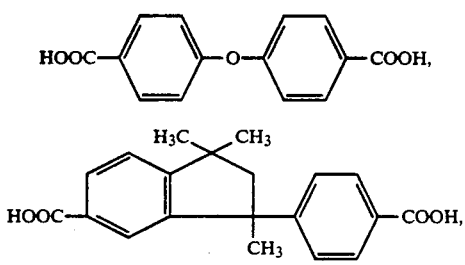

and mixtures thereof.

Preferred cyoloaliphatic diamines are at least one of 1-amino-3-aminomethyl-3', 5,5'-trimethylcyclohexane, 1,3- and 1,4-diaminocyclohexane, 1,3- and 1,4-diaminomethylcyclohexane, and Formula I:

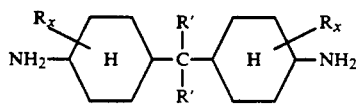

wherein R stands for an alkyl radical with 1 to 10 carbon atoms, preferably methyl, ethyl, or isopropyl; R' is hydrogen or alkyl having 1 to 6 carbon atoms, preferably methyl or ethyl; and x is 0 to 4. The polyamides and the copolyamides preferably have a molecular weight of at least 5,000, more preferably 10,000 to 100,000. Diamines of Formulas II to IV are preferred.

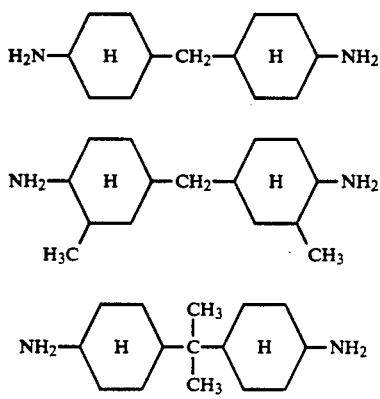

The optional nonaromatic dicarboxylic acids are preferably aliphatic or cycloaliphatic dicarboxylic acids with 6 to 20 carbon atoms, those with 6 to 12 carbon atoms such as adipic acid, sebacic acid, azelaic acid, dodecanedicarboxylic acid or cyclohexane dicarboxylic acid being especially preferred.

The preferred optional additional diamines are aliphatic diamines with 2 to 20 carbon atoms, those with 2 to 12 carbon atoms such as ethylene diamine, hexamethylene diamine, as well as their alkyl-substituted derivatives, and neopentane diamine being especially preferred.

The preferred optional lactams and ω-aminocarboxylic acids are caprolactam and lactam 12, as well as ω-aminohexanoic, ω-aminoundecanoic and ω-aminododecanoic acid. Also salt pairs of aliphatic diamines with 2 to 20 carbon atoms and aliphatic dicarboxylic acids with 6 to 20 carbon atoms, preferably 6.12-, 6.10-, 6.9- and 6.6- salts, can also be used.

The production of the semicrystalline homo- and co-polyamides used as semicrystalline component a), as well as that of the amorphous copolyamides used as component b), is known.

The percentages of the molding composition components a) and b), as well as the manufacturing conditions therefor, are preferably selected so that the semicrystalline polyamide a) forms the continuous phase and the amorphous copolyamide b) is the dispersed phase. The amorphous copolyamide can be maintained as the dispersed phase even in high concentrations by suitable selection of a compatibility agent and of the compounding conditions; hence the individual second-order transition temperatures of components a) and b) and the melting point of component a) remain largely unaffected.

The action of the preferred compatibility agents is based on their reactivity with the end groups of the two polyamide components a) and b). Examples of such reactive products are meltable oligomeric and/or polymeric compounds which possess groups reactive with the terminal groups of the polyamides, i.e. acid anhydride carboxylic acid, diacrylic acid, epoxies, amino, and/or carboxylic acid groups neutralized with metal salt. Other examples of reactive products are functionalized oligomeric polyolefins or copolyolefins with low second-order transition points, or styrene-maleic acid anhydride oligomers with 4 to 10 acid anhydride groups, as well as core-shell polymers which possess reactive groups, preferably carboxylic acid, diacrylic acid, maleic acid anhydride, and/or epoxy groups.

Styrene-maleic acid anhydride oligomers (e.g. SMA resins of the firm Arco (USA), Types 1000, 2000, or 3000) or polyolefins and copolyolefins of low molecular weight, functionalized with maleic acid anhydride, have only a compatibility promoting action. Their advantage is that they can be employed in quantities of less than 10%.

Impact resistance improvement of the molding compositions according to the invention can be achieved by addition of modifiers customary for polyamides. Block copolymers, e.g. those with a polystyrene hard block and a functionalized elastomer block, or grafted copolyolefins with a grafting degree of 0.2 to 2.0 molar % maleic acid anhydride and low second-order transition temperatures can provide an increase in impact resistance and, in addition, a remarkable compatibility improvement.

The advantageous combination of compatibility promotion and impact resistance increase is often also possible with core shell polymers which have a slightly crosslinked core with a second-order transition temperature less than −30° C. and a crosslinked polar shell. Examples are acrylic acid esters and methacrylic acid esters, preferably alkyl acrylate or methyl methacrylate. Preferred are core-shell polymers with a shell carrying reactive groups, in particular carboxylic acid, diacrylic acid, acid anhydride or epoxy, diacrylic acid maleic acid anhydride groups being especially preferred.

The production of the molding compositions according to the invention occurs by joint melting of the semicrystalline and amorphous polyamides, advantageously with simultaneous addition of the compatibility agent and under intensive action of shearing forces. The latter ensures good homogenization and distribution of the phases. The compatibility agent stabilizes the phase structure for the subsequent thermoplastic processing steps; namely, the discharge of the melt as a strand, cooling, and either comminution or shaping of parts from the melt. The addition of the compatibility agent may also occur in a separate extrusion step. The mixing process is carried out continuously in one or several process steps. Preferably twin-screw extruders, e.g. the so-called ZSK types of the firm Werner & Pfleiderer, Stuttgart, Germany, or the so-called Buss Cokneter of the firm Buss, Pratteln, Switzerland, are used.

It is characteristic of the molding compositions according to the invention that the semicrystalline and the amorphous polyamides do not alloy or do so only partially. While the amorphous polyamide solidifies like glass, the semicrystalline polyamide forms, as it solidifies, its own characteristic crystalline and amorphous polymer fraction. The crystalline fraction can be influenced, e.g. by nucleation agents, so that it develops in fine crystalline form.

The molding compositions according to the invention can be modified in many ways. Thus, they can be mineral-filled, reinforced, and/or flame-retarded e.g. by the inclusion of magnesium hydroxide. Advantageously, processing aids and stabilizers are added to the molding compounds; these, among other things, retard decomposition by oxygen, heat, and radiation.

The compositions of this invention are in general of excellent color and are stable to discoloration. They can be pigmented or dyed, mainly by reextrusion, in all colors. Pigments and dyes, known in the art of coloration of polyamides, can be used. Preforms according to the invention can be produced by the usual shaping processes, e.g. injection molding, extruding, coextruding, and blow-molding.

Molding compounds according to the invention, without component c) (the compatibility agent), can be produced with an amorphous copolyamide proportion b) of up to about 40 parts per 100 parts of molding composition without delamination occurring. Such molding compounds have moduli of elasticity which are at least as high as those of the pure components (according to the volume—fraction mixing rule).

Molding compounds according to the invention, which contain the compatibility agent in such small amounts that it cannot act as impact resistance modifier, still show improvements in notch impact toughness. Even molding compounds according to the invention without compatibility agents show, in the conditioned state, better notch impact toughness than the pure amorphous copolyamide.

A important advantage of the molding compounds according to the invention is their very good resistance to solvents and, thereby, stress-corrosion cracking. But their very special advantage is their high rigidity, which is not—or not substantially—impaired in humid atmosphere and elevated temperatures. Thus the shear modulus curve, which is a measure of the change of stiffness on elevating temperature, of the molding compositions according to the invention is far preferable to that of "comparable" molding compounds of semicrystalline polyamide and amorphous copolyamide without dimerized fatty acid as a building block.

The examples described below are illustrative and are not to be regarded as limiting.

TABLE 1

Composition of thermoplastic molding compounds.

| Example | Semicrystalline component | | Amorphous copolyamide | | Compatibility agent | | Additional component |
|---|---|---|---|---|---|---|---|
| 1 | 40 parts | PA 6 | 40 parts | No. 1 | 20 parts | No. 2 | — |
| 2 | 40 parts | PA 6.6 | 40 parts | No. 1 | 20 parts | No. 2 | — |
| 3 | 30 parts | PA 6 | 50 parts | No. 2 | 20 parts | No. 2 | — |
| 4 | 30 parts | PA 6 | 50 parts | No. 3 | 20 parts | No. 1 | — |
| 5 | 30 parts | PA 6 | 50 parts | No. 3 | 20 parts | No. 2 | — |
| 6 | 40 parts | PA 6 | 48 parts | No. 1 | 12 parts | No. 1 | — |
| 7 | 40 parts | PA 6 | 54 parts | No. 1 | 6 parts | No. 1 | — |
| 8 | 40 parts | PA 6 | 48 parts | No. 1 | 12 parts | No. 2 | — |
| 9 | 60 parts | PA 6 | 40 parts | No. 1 | — | — | — |
| 10 | 60 parts | PA 6.6 | 40 parts | No. 1 | — | — | — |
| 11* | 20 parts | PA 6 | 50 parts | No. 4 | 15 parts | No. 1 | 15 parts talc |
| 12* | 50 parts | PA 6.6 | 30 parts | No. 5 | 12 parts | No. 1 | — |
| | | | | | 8 parts | No. 2 | — |
| 13* | 48 parts | PA 6 | 32 parts | No. 5 | 20 parts | No. 1 | — |

*Comparison examples

Examples

The components of the thermoplastic molding compositions are premixed in a tumbling mixer. If needed, lubricants, crystallization accelerators, and/or heat stabilizers are added in amounts of 0.1 to 3 parts. Thereafter the mixture is fed into the intake zone of a twin-screw extruder, Model ZSK 30 (Werner & Pfleiderer) and extruded. The products are drawn off as a strand and granulated. From the granulates, the test specimens used are produced on an injection molding machine, Model Arburg Allrounder 320-210-750.

Table 1 shows the composition of the thermoplastic molding compositions of Examples 1 to 13, Examples 11 to 13 being comparison examples.

TABLE 2

Composition of the amorphous copolyamides used in Examples 1-10.

| No. | Aromatic dicarboxylic acid | Dimerized fatty acid | Cycloaliphatic diamine |
|---|---|---|---|
| 1 | 35 molar parts isophthalic acid | 15 molar parts No. 1 | 50 molar parts 3,3'-dimethyl-4,4'-diaminodicyclohexyl methane |
| 2 | 44 molar parts isophthalic acid | 6 molar parts No. 1 | 50 molar parts 3,3'-dimethyl-4,4'-diaminodicyclohexyl methane |
| 3 | 21 molar parts isophthalic acid 17 molar parts terephthalic acid | 12 molar parts No. 2 | 50 molar parts 1-amino-3-aminomethyl-3',5,5'-trimethyl-cyclohexane |

The amorphous copolyamides are produced in conventional polyamide reactors according to the prior art. The composition of the amorphous copolyamides used in the examples is given in Table 2. Copolyamide No. 4, used in Comparison Example 11, is an amorphous copolyamide of the firm of EMS-Chemie based on hexamethylene diamine, isophthalic acid, and terephthalic acid sold under the commercial name "Grivory G 21".

Copolyamide No. 5, used in the comparison examples 12 and 13, is an amorphus copolyamide of the firm EMS-Chemie based on isophthalic acid, terephthalic acid, hexamethylene diamine, and 3,3'-dimethyl-4,4'-diaminodicyclohexylmethane (and thus contains no dimerized fatty acid), which is sold under the commercial name "Grivory XE 3038".

Dimerized fatty acids

Dimeric Acid 1:

A mixture of dimerized fatty acids having 36 carbon atoms containing monomer < 0.1 part dimer > 98 parts trimer < 1.0 part other < 1.0 part It is sold under the commercial name "Pripol 1009" by the firm Unichema.

Dimeric Acid 2:

A mixture of dimerized fatty acids having 36 carbon atoms containing

| monomer | 4 parts |
|---|---|
| dimer | 91 parts |
| trimer | 5 parts |

It is sold by the firm Henkel-Emery under the commercial name "Empol 1014".

Semicrystalline polyamides

Polyamide 6 : medium-viscous injection molding type, $\eta$ rel ca. 1.75

Polyamide 6.6 : medium-viscous injection molding type, $\eta$ rel ca. 1.8

Compatibility agents

Compatibility Agent 1:

An ethylene-propylene copolymer grafted with 0.6 mol % maleic acid anhydride having a polypropylene content of 20 mol %.

Compatibility Agent 2:

A core-shell polymer with a methyl methacrylate shell grafted with maleic acid anhydride and a core of butyl acrylate.

In Table 3 the characteristic properties of the molding composition components are compiled. In Table 4, the characteristic properties of the thermoplastic molding compositions according to the invention, as well as those of the comparison examples, are summarized. In Table 5, the mechanical properties of the components and of the thermoplastic molding compositions according to the invention, as well as those of the comparison examples, are set forth.

The characteristic properties include the second-order transition temperature Tg (measured at the beginning of the glass transition stage as Tg onset), the relative solution viscosity $\eta$ rel, the melt viscosity, and the melt temperature $T_s$. The second-order transition and melt temperatures are determined by DSC (Differential Scanning Calorimetry) in the dry state. The DSC measurements are performed at a heating rate of 20° C./min on a Du Pont Thermal Analyzer Model 1091B. The relative solution viscosity is determined according to DIN 53727 as 0.5% solution in m-cresol and the melt viscosity according to DIN 53735 at 270° C. and 122.6 N.

The following mechanical properties are determined: Impact toughness $a_n$ and notch impact toughness $a_k$ according to Charpy (dry and conditioned) and DIN 53453 at 23° C.; modulus of elongation (dry and conditioned) according to DIN 53457 at 23° C.; shear modulus G (dry and conditioned) according to DIN 53445 at 23° and 100° C. (torsion apparatus: Nyrenne, heating rate: 1° C./min, measurement frequency: 1 Hz); and stress corrosion resistance in ethanol according to DIN 53449 at 23° C. For the conditioning, the materials are stored at 70° C. and 62% relative humidity for 7 days.

As the values for the melt and the glass transition temperatures (which are changed only slightly, if at all) show (see Table 4), the thermoplastic molding compositions according to the invention are multiphasal. The molding compositions of the comparison examples, on the contrary, show only a single changed Tg. This proves that, in the comparison examples, the molding composition components do not form separate phases.

The scanning electron microscope photographs of FIGS. 1A, 1B, and 1C show that, by the better phase adhesion due to the compatibility agent, fine phase morphologies, and therefore good and stable mechanical properties, for the molding compositions according to the invention are achieved. Thus, the torsion modulus curves of the molding compositions according to the invention at about 100° C., especially in the conditioned state, are substantially higher than the curves of the pure semicrystalline components and of the molding compositions from the comparison examples.

Molding compositions according to the invention made of semicrystalline polyamide and a high proportion of amorphous copolyamide (>40 parts per 100 parts of total compound) without any compatibility agent, on the other hand, lead to irregular strands on extrusion and to delamination in injection molded articles made therefrom.

For the scanning electron microscope photographs (REM) the samples were prepared as follows and then measured in an REM apparatus of Zeiss, Model DSM 950. After immersion in liquid nitrogen, the specimens were instantly broken. The amorphous copolyamide was eluted by treating the fracture surface with 1,3-dimethyl-2-imidazolidone (DMI). For selective extraction of the olefinic compatibility agent, toluene is used.

BRIEF DESCRIPTION OF THE DRAWINGS

A comparison of FIGS. 1B and 1C with FIG. 3A and of FIGS. 2B and 2C with FIG. 3B shows that the amorphous copolyamide can be eluted separately in molding compositions with and without the compatibility agent. This demonstrates that amorphous copolyamide and semicrystalline polyamide form separate phases. The compatibility agent eluted separately in FIGS. 1C and 2C leaves clearly smaller and more uniform "holes" as compared with the eluted semicrystalline polyamides. In FIGS. 1B and 2B, it can be seen that, besides the semicrystalline polyamide, the compatibility agent was also dissolved since, in addition to the large holes, the typical small holes of the compatibility agent are visible. The holes of the compatibility agent are also recognizable in the canals of the eluted amorphous copolyamide. This shows that, unlike pure impact resistance modifiers, the compatibility agent is concentrated at the phase boundary faces and creates interactions between the otherwise incompatible polyamides.

Figure 1A:
FIG. 1A shows the untreated fracture of a specimen from Example 1.
Figure 1B:
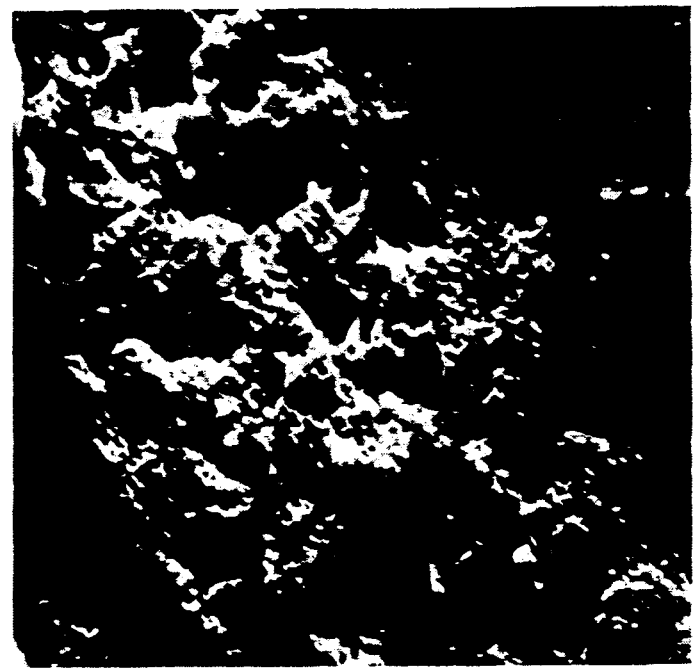
FIG. 1B shows the fracture thereof treated with DMI whereby both the compatibility agent and the amorphous copolyamide have been eluted.
Figure 1C:
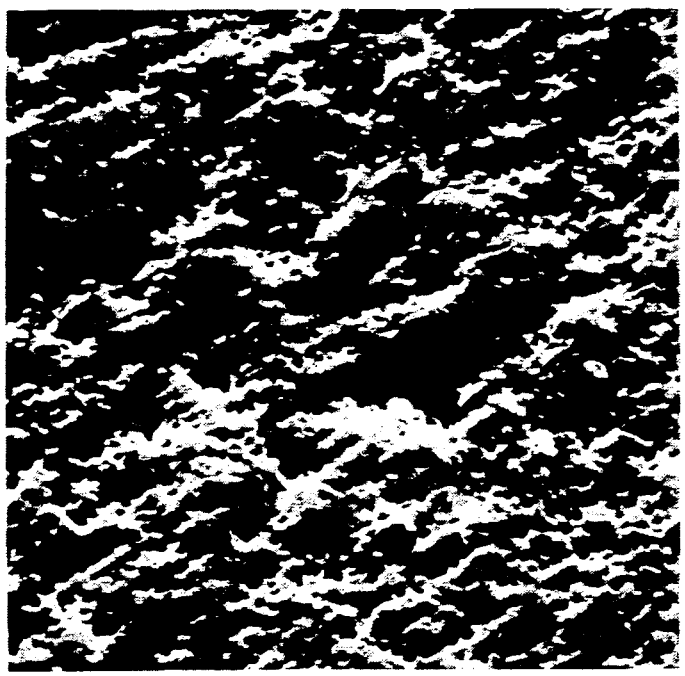
In FIG. 1C only the compatibility agent was eluted with toluene at the fracture surface.
Figure 2A:
FIG. 2A shows the unmodified fracture of a specimen from Example 2.
Figure 2B:
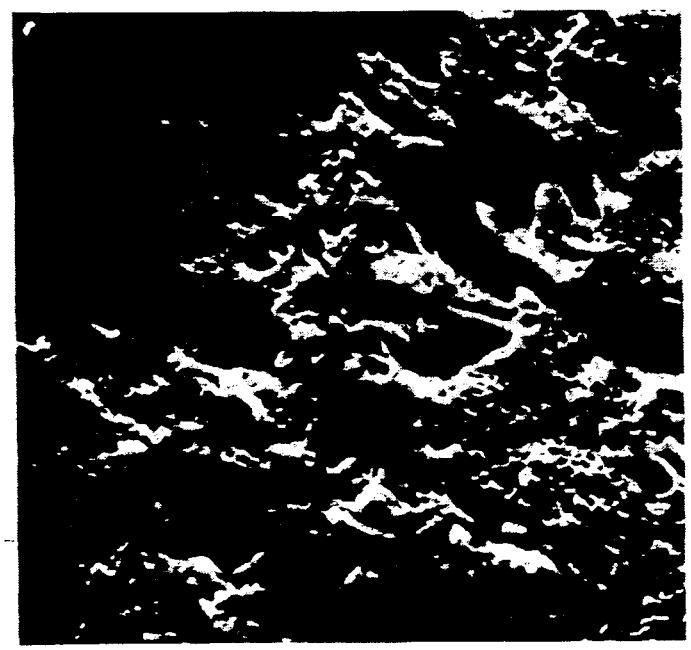
FIG. 2B shows the fracture treated with DMI in which both the amorphous copolyamide and the agent have been eluted.
Figure 2C:
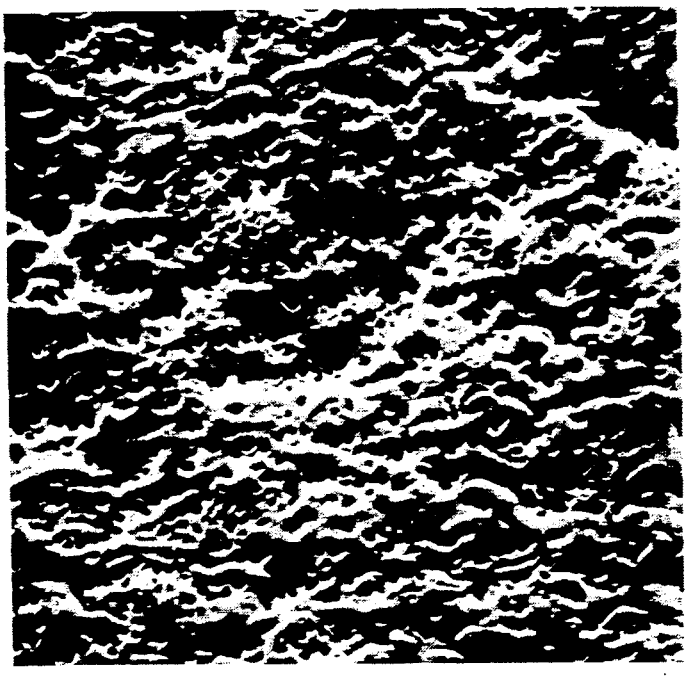
FIG. 2C shows the fracture treated with toluene in which only the compatibility agent has been eluted.
Figure 3A:
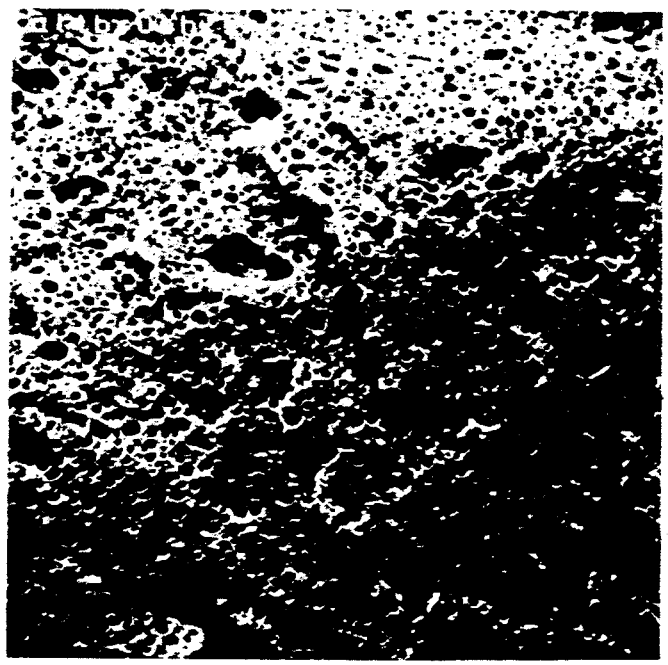
FIG. 3A shows the DMI-treated fracture of a specimen from Example 9 in which the amorphous copolyamide has been eluted.
Figure 3B:
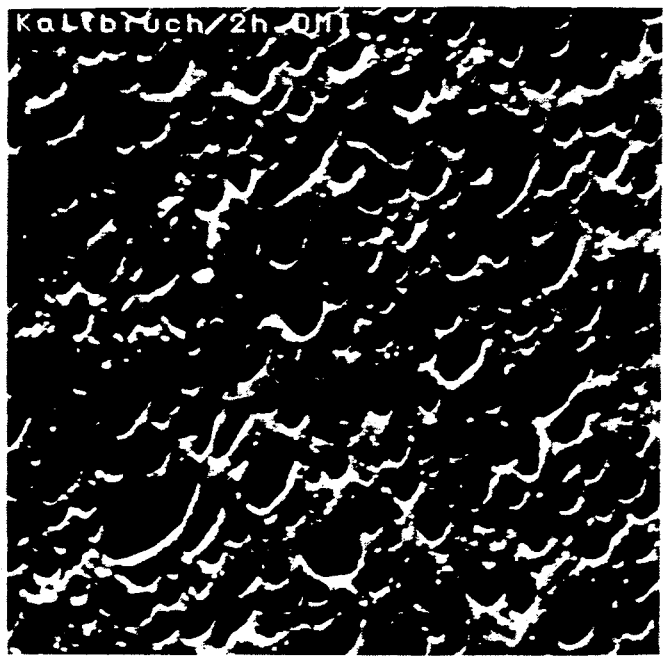
FIG. 3B shows the DMI-treated fracture of a specimen from Example 10 in which the amorphous copolyamide has also been eluted.

From the molding compounds of the Comparison Examples 11 to 13, on the contrary, it is not possible to eluate a polyamide component separately. This shows that these molding compounds are monophasal and the individual components are not present as separate phases.

TABLE 3

Characteristic properties of the components of the thermoplastic molding compositions according to the invention as well as of the comparison examples.

| Component | $T_g^1$ [°C.] dry | $\eta_{rel}^2$ | Melt viscosity$^3$ [Pa · s] | $T_s^4$ [°C.] |
|---|---|---|---|---|
| Polyamide 6 | 43 | 1.75 | 250–350 | 222 |
| Polyamide 6.6 | 48 | 1.8 | 200–400 | 261 |
| Copolyamide 1 | 155 | 1.4–1.45 | 2500–4500 | — |
| Copolyamide 2 | 202 | 1.3–1.35 | 3000–5000 | — |
| Copolyamide 3 | 155 | 1.3–1.35 | 500–700 | — |
| Copolyamide 4* | 120 | 1.5–1.55 | 700–900 | — |
| Copolyamide 5* | 140 | 1.4–1.45 | 700–900 | — |
| Compatibility agent 1 | −80 | — | — | — |
| Compatibility agent 2 | −40 | — | — | — |

$^1$Second order transition temperature (DSC)
$^2$Relative viscosity acc. to DIN 53727 as 0.5% solution in m-cresol.
$^3$Acc. to DIN 53735 at 270° C. and 122.6 N.
$^4$Melt temperature (DSC)
*Comparison examples.

TABLE 4

Characteristic properties of the thermoplastic molding compositions according to the invention and of the comparison examples

| Molding compound | $T_g^1$ [°C.] dry | $T_g^2$ [°C.] dry | $T_s^3$ [°C.] | Melt viscosity$^4$ [Pa · s] |
|---|---|---|---|---|
| Example 1 | 33 | 158 | 218 | 10,221 |
| Example 2 | n.m.$^5$ | 156 | 257 | 3,098 |
| Example 3 | 37 | n.m. | 217 | 219 |
| Example 4 | 46 | 153 | 222 | 1,820 |
| Example 5 | 45 | 148 | 218 | 2,525 |
| Example 6 | 48 | 153 | | 1,836 |
| Example 7 | 48 | 154 | | 1,658 |
| Example 8 | 47 | 155 | | 2,903 |
| Example 9 | 43 | 159 | 222 | 599 |
| Example 10 | n.m. | 158 | 261 | 578 |
| Example 11* | −85$^6$ | — | 206 | — |
| Example 12* | −63$^6$ | — | 258 | 795 |
| Example 13* | −65$^6$ | — | 220 | 491 |

$^1$Second-order transition temperature of the semicrystalline blend component (DSC)
$^2$Second-order transition temperature of the amorphous blend component (DSC)
$^2$Melt temperature (SC)
$^4$to DIN 53735 at 270° C. and 122.6 N.
$^5$n.m. = not measurable.
$^6$"Mixed" Tg. (One Tg only beause of formation of a true alloy)
*Comparison examples.

TABLE 5

Mechanical properties of the components and of the thermoplastic molding compositions according to the invention (Examples 1 to 10) and of the comparison examples (Examples 11 to 13).

| | Component/Molding Compound | $r^1$ (dry) (M/mm$^2$) | $r^1$ (conditioned)$_k^2$ (M/mm$^2$) | (dry) (kJ/m$^2$) | $a_k^2$ (conditioned)$_n^3$ (kJ/m$^2$) | (dry) (kJ/m$^2$) | $a_n^3$ (conditioned) (kJ/m$^2$) | $G^4$ (23° C.) (dry) |
|---|---|---|---|---|---|---|---|---|
| Polyamide | Polymid 6 | 2800 | 900 | 5 | 15 | o. Br.$^6$ | o. Br. | 1012 |
| | Polymid 6.6 | 3600 | 1700 | 5 | 10 | o. Br. | o. Br. | 1033 |
| Copolyamide | Copolyamid 1 | 2200 | 1920 | 2.0–4.0 | 2.0–3.5 | o. Br. | o. Br. | |
| | Copolyamid 2 | 2260 | 2120 | 0.8–1.3 | 0.8–1.3 | 30–60 | 30–60 | |
| | Copolyamid 3 | 2400 | 2350 | 0.8–1.5 | 0.8–1.5 | o. Br. | o. Br. | |
| | Copolyamid 4 | 2900 | 2950 | 0.8–2 | 0.8–2 | o. Br. | o. Br. | |
| | Copolyamid 5 | 2970 | 3230 | 0.8–2 | 0.8–2 | o. Br. | o. Br. | |
| Example | Beispiel 1 | 1977 | 1280 | 24 | 56 | o. Br. | o. Br. | |
| | Beispiel 2 | 2000 | 1420 | 15 | 32 | o. Br. | o. Br. | |
| | Beispiel 3 | 2120 | 1690 | 14 | 14 | o. Br. | o. Br. | 852 |
| | Beispiel 4 | 1660 | 1220 | 44 | 49 | o. Br. | o. Br. | 678 |
| | Beispiel 5 | 1980 | 1540 | 11 | 14 | o. Br. | o. Br. | 808 |
| | Beispiel 6 | 1980 | 1240 | 23 | o. Br. | o. Br. | o. Br. | 806 |
| | Beispiel 7 | 2250 | 1520 | 6 | 8 | o. Br. | o. Br. | 831 |
| | Beispiel 8 | 2270 | 1450 | 7 | 15 | o. Br. | o. Br. | 863 |
| | Beispiel 9 | 3030 | 1390 | 0.7 | 6.3 | o. Br. | o. Br. | |
| | Beispiel 10 | 2620 | 1930 | 2.2 | 4.9 | o. Br. | o. Br. | |

TABLE 5-continued

| | | | | | | | | |
|---|---|---|---|---|---|---|---|---|
| Beispiel 11* | 2850 | 2900 | 17 | 19 | o. Br. | o. Br. | | 1145 |
| Beispiel 12* | 2130 | 2000 | 35 | | o. Br. | o. Br. | | |
| Beispiel 13* | 1950 | 1900 | 39 | | o. Br. | o. Br. | | |

| | Component/ Molding Compound | (MPa) (conditioned) | G[4] (100° C.) (dry) | (MPa) (conditioned) | stress corrosion resistance[5] |
|---|---|---|---|---|---|
| Polyamide | Polymid 6 | 405 | 162 | 151 | >60 |
| | Polymid 6.6 | 546 | 200 | 192 | >60 |
| Copolyamide | Copolyamid 1 | | | | <10 |
| | Copolyamid 2 | | | | <10 |
| | Copolyamid 3 | | | | <10 |
| | Copolyamid 4 | | | | |
| | Copolyamid 5 | | | | |
| Example | Beispiel 1 | | | | >60 |
| | Beispiel 2 | | | | >60 |
| | Beispiel 3 | 623 | 322 | 316 | >60 |
| | Beispiel 4 | 561 | 275 | 277 | >60 |
| | Beispiel 5 | 609 | 309 | 318 | >60 |
| | Beispiel 6 | 554 | 275 | 266 | >60 |
| | Beispiel 7 | 640 | 311 | 331 | >60 |
| | Beispiel 8 | 643 | 281 | 294 | >60 |
| | Beispiel 9 | | | | >60 |
| | Beispiel 10 | | | | >60 |
| | Beispiel 11* | 1390 | 121 | 110 | >60 |
| | Beispiel 12* | 680 | | >50 | <60 |
| | Beispiel 13* | 800 | | >50 | <60 |

[1]Modulus of elasticity according to DIN 53457 at 23° C.
[2]Notched impact strength according to Charpy per DIN 53453 at 23° C.
[3]Impact strength according to Charpy per DIN 53453 at 23° C.
[4]Torsion modulus according to DIN 53445.
[5]Stress corrosion resistance in ethanol per DIN 53449 at 23° C.
[6]Without break.
*Comparison examples.

While only a limited number of specific embodiments of the present invention have been expressly disclosed, it is, nonetheless, to be broadly construed, and not to be limited except by the character of the claims appended hereto.

What we claim is:

1. A thermoplastic molding composition comprising
a) 25-75 parts of a semicrystalline polyamide;
b) 75-25 parts of an amorphous copolyamide of
   (i) 25-45 molar parts of at least one aromatic dicarboxylic acid,
   (ii) 25-5 molar parts of at least one dimerized fatty acid,
   (iii) 50 molar parts of at least one cycloaliphatic diamine, the sum of the acid groups of acids (i) and (ii) substantially equaling the sum of the amine groups of amine (iii);
c) 0-30 parts of a compatibility agent,
a), b) and c) totaling 100 parts.

2. The composition of claim 1 wherein b) (i) is present in an amount of 38-45 molar parts and b) (ii) is present in an amount of 5-12 molar parts.

3. The composition of claim 1 wherein c) is present in an amount of 1-30 parts.

4. The composition of claim 1 wherein c) is present in an amount of less than 10 parts.

5. The composition of claim 1 further comprising 0 to 60 parts of at least one additive selected from the group consisting of processing aids, stabilizers, flame retardants, fillers, and reinforcing fibers.

6. The composition of claim 5 wherein said additive is selected from the group consisting of flame retardants, fillers, and reinforcing fibers.

7. The composition of claim 1 wherein said semicrystalline polyamide is a homopolyamide derived from at least one substance selected from the group consisting of ω-aminocarboxylic acids having 6 to 9 carbon atoms, lactams having 6 to 9 carbon atoms, aliphatic diamines having 4 to 12 carbon atoms, and linear dicarboxylic acids having 6 to 12 carbon atoms.

8. The composition of claim 7 wherein said semicrystalline polyamide is selected from the group consisting of PA 6, PA 4.6, Pa 6.6, PA 6.9, PA6.10, and PA 6.12.

9. The composition of claim 1 wherein said semicrystalline polyamide is a copolyamide having a melting point, measured as the endothermic maximum of the DSC melting curve, of at least 170° C.

10. The composition of claim 9 wherein said semicrystalline copolyamide is selected from the group consisting of PA 6, PA 4.6, PA 6.6, PA 6.8, PA 6.9, PA 6.10, Pa 6.12, PA 9.6, and PA 12.6.

11. The composition of claim 1 wherein said aromatic dicarboxylic acid is selected from the group consisting of mononucleic dicarboxylic acids, multi-nucleic dicarboxylic acids, and mixtures thereof.

12. The composition of claim 11 wherein said aromatic dicarboxylic acid is selected from the group consisting of isophthalic acid, terephtalic acid, 5-tert-butylisophthalic acid, naphthalene dicarboxylic acid,

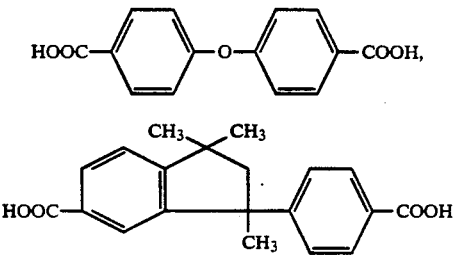

and mixtures thereof.

13. The composition of claim 1 wherein said dimerized fatty acid has 36 to 45 carbon atoms.

14. The composition of claim 13 wherein said dimerized fatty acid has a dimer fraction of at least 90%.

15. The composition of claim 13 wherein said dimer fraction is at least 97%.

16. The composition of claim 1 wherein b) (iii) is selected from the group consisting of a mononucleic diamine; a polynucleic diamine of the Formula

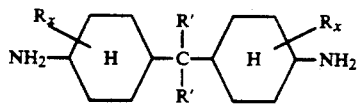

I wherein R is an alkyl radical having 1 to 10 carbon atoms, R' is hydrogen or an alkyl radical having 1 to 6 carbon atoms; and x is 0 to 4; and mixtures thereof.

17. The composition of claim 16 wherein said polynucleic diamine is selected from the group consisting of

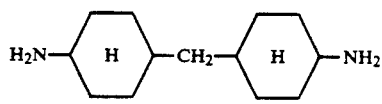

II

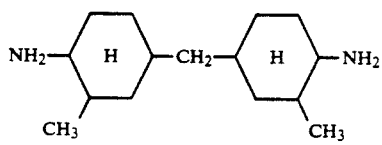

III

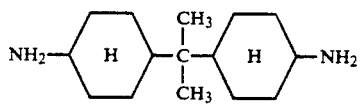

IV and mixtures thereof.

18. The composition of claim 16 wherein said mononucleic diamine is selected from the group consisting of 1-amino-3-aminomethyl-3,5,5-trimethylcyclohexane, 1,3-diaminocyclohexane, 1,4-diamonocyclohexane, 1,3-diaminomethylcyclohexane, 1,4-diaminomethylcyclohexane, and mixtures thereof.

19. The composition of claim 1 wherein c) is at least one oligomeric or polymeric meltable compound which possesses groups reactive with terminal groups of said semicrystalline polyamide and said amorphous copolyamide.

20. The composition of claim 19 wherein said reactive groups are selected from the class consisting of carboxylic acid groups neutralized with a metal salt, acid anhydrides, carboxylic acids, epoxy, and amino.

21. The composition of claim 19 wherein c) is a copolyolefin grafted with maleic anhydride to a graft degree of 0.2 to 2.0 molar %.

22. The composition of claim 19 wherein c) is a oligomeric polyolefin or copolyolefin.

23. The composition of claim 22 wherein c) is selected from the group consisting of styrene-maleic acid anhydride oligomers having 4 to 10 acid anhydride groups.

24. The composition of claim 19 wherein c) is a core-shell polymer comprising a core which has a second-order transition temperature less than −30° C., and a crosslinked shell of polar building blocks.

25. The composition of claim 24 wherein said shell contains groups reactive to polyamides.

26. The composition of claim 25 wherein said shell contains reactive groups taken from the class consisting of acrylic acid, methacrylic acid esters, maleic acid anhydride, carboxylic acid, and epoxy groups.

27. A process for the production of the composition of claim 1 comprising melting and intensively mixing a), b), and c) under the action of shearing forces to form a melt, then discharging said melt, and forming said melt into shapes.

28. The process of claim 27 wherein said melt is discharged as a strand that is cooled and granulated.

29. Shapes which are formed of the composition of claim 1.

* * * * *